June 8, 1954      W. C. FURNAS      2,680,285
METHOD OF MAKING LAMINATED STRUCTURES
Filed Aug. 28, 1950
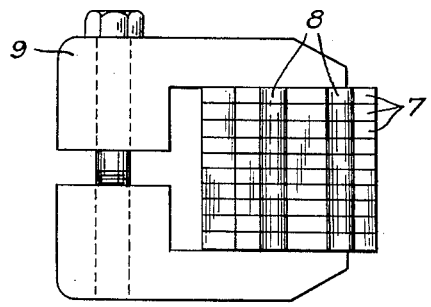
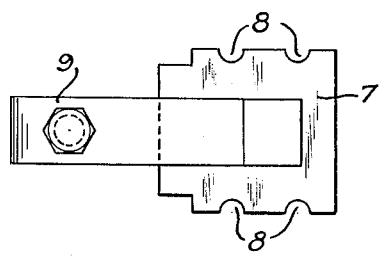
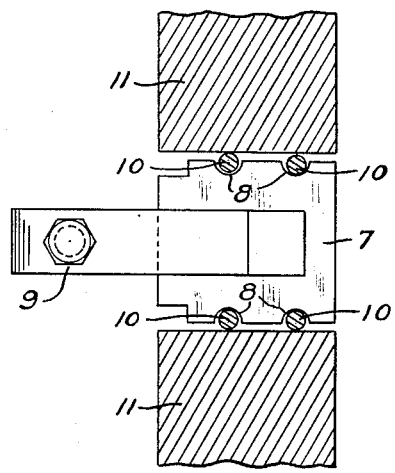
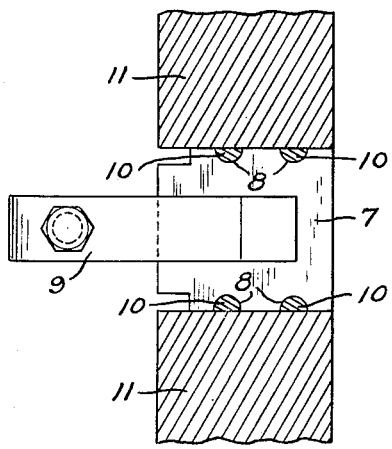
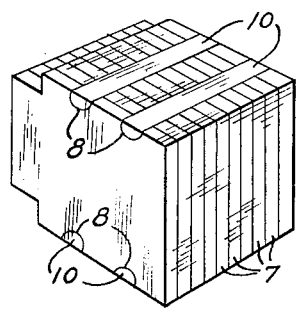
INVENTOR.
William C. Furnas
BY
Lieber & Lieber
ATTORNEYS.

Patented June 8, 1954

2,680,285

UNITED STATES PATENT OFFICE 2,680,285

METHOD OF MAKING LAMINATED STRUCTURES

William C. Furnas, Batavia Township, Kane County, Ill., assignor to Furnas Electric Company, Batavia, Ill., a corporation of Illinois Application August 28, 1950, Serial No. 181,769

2 Claims. (Cl. 29—155.61)

The present invention relates in general to improvements in the art of fabricating articles composed of a plurality of mutually coacting united sheets of material, and relates more specifically to an improved laminated metallic structure and to an improved method of producing such structures.

The primary object of my present invention is to provide a durable structure composed of mutually coacting fusible laminations, and a simple but effective method of producing such structures.

Laminated structures each consisting of a plurality of fusible metal plates coacting with each other along their flat faces and firmly united, are extensively utilized especially in the electrical industry for various purposes; and in the past the adjoining plates or laminations of such structures were either bolted or riveted together or united by arc welding of the metal plates directly to each other. These prior methods of joining the laminations were not only tedious and costly, but they did not insure effective permanent unions between all of the coacting metal plates especially at their edges. The previous laminated metallic structures therefore could not be depended upon for long periods of use particularly if subjected to repeated impacts when finally applied.

It is, therefore, an important object of the present invention to provide an improved laminated metal structure wherein the adjoining plates or laminations are firmly and permanently united especially at their outer edges so as to effectively resist subsequent separation.

Another important object of the invention is to provide an improved method of fabricating laminated metal structures in an economical and expeditious manner so that the adjoining plates or laminations are perfectly alined and firmly interconnected and minimum final dressing or machining of the final structures is required.

A further object of this invention is to provide an improved laminated magnetic assemblage wherein the adjacent metallic laminations are rigidly interconnected by welding stock spanning the adjoining external edges of the lamination plates, at local zones distributed throughout the structure so as to positively prevent subsequent separation thereof.

Still another object of my invention is to provide an improved mode of permanently uniting a group or stack of magnetic lamination plates by welding fusible elongated elements across the edges of the stacked laminations at selected localities which will insure most perfect union.

These and other objects and advantages of the present improvement will be apparent from the following detailed description.

A clear conception of the several steps involved in my improved fabricating method, and of one specific form of final laminated structure resulting from the use of the method, may be had by referring to the drawing accompanying and forming a part of this specification wherein like reference characters designate the same or similar parts in the various views.

Fig. 1 is a somewhat diagrammatic top view of a stack of preformed laminations clamped together and transversely grooved preparatory to interconnection of the laminations;

Fig. 2 is a similarly diagrammatic side view of the lamination stack and clamp of Fig. 1;

Fig. 3 is a view similar to that of Fig. 2 but showing the welding stock initially applied to the lamination grooves and the welding electrodes likewise applied thereto;

Fig. 4 is another view similar to that of Fig. 3 showing the heated electrodes pressed against the welding stock or fusible elements to effect the final welding operation; and Fig. 5 is a perspective view of the finished laminated structure alone showing the laminations finally permanently united.

The gist of my present invention is the provision of an improved method of uniting a group of mutually coacting lamination plates by applying a fusible element across the adjacent edges thereof and by subsequently heating the element and the adjoining lamination edges to melting temperature and pressing them together while welding is being effected, and while the improvement has been shown and described herein as being advantageously applicable in the production of laminated magnetic assemblages such as employed in magnetic switches of the type forming the subject of copending application Serial No. 174,758, filed July 19, 1950, by Harold E. Cobb and William C. Furnas, it is not my desire or intent to unnecessarily restrict the utility of the invention by virtue of this limited showing. It is furthermore contemplated that specific descriptive terms used herein be given the broadest possible interpretation consistent with the disclosure.

Referring to the drawing which shows a typical embodiment of the invention, the procedure in carrying on the improved method may be as follows: A plurality of lamination plates 7 which may be formed of fusible magnetic metal are first produced with the aid of punches and dies, and each of these plates 7 may be provided with opposite edge notches 8 and are of identical shape and size. Any desired number of these laminations plates 7 may thereafter be grouped or stacked upon each other so as to perfectly aline the corresponding notches 8 thereof in order to form straight local grooves spanning the group at the lamination edges, whereupon a clamp 9 may be applied to the mutually co-acting flat laminations so as to firmly hold them in intimate contact with each other, as shown in Figs. 1 and 2. If so desired, the alined groove notches 8 may be formed in the group after stacking and clamping has been effected.

A fusible metal element or welding rod 10 should thereafter be inserted throughout the length of each groove formed by the alined notches 8, and these rods should preferably have uniform transverse cross-sectional area equal to that of the semi-circular grooves but should project outwardly beyond their receiving grooves when initially applied as in Fig. 3. Welding electrodes 11 of well known construction may then be applied to the outer projecting portions of the welding rods 10, whereupon current may be applied to the electrodes 11 and they should be pressed against the fusible elements to melt and force the same entirely into the adjacent grooves, as depicted in Fig. 4. During this step of the method, the molten rods 10 will be spread so as to fill the notches 8 and the edges of the laminations 7 at these notches will also be melted slightly and welded to the rods 10 and to each other. After the welding operation has been thus completed, the adjacent surfaces of the laminated assemblage may be dressed by grinding to remove excess welding stock at the rod ends, thereby completing the improved structure as illustrated in Fig. 5.

From the foregoing description of the invention, it should be apparent that I have in fact provided a simple and effective method of producing laminated structures, which results in the production of durable final assemblages. All of the structures produced by the improved method will be uniformly durable, and the groove forming notches 8 may either be stamped into the edges of the individual laminations during formation thereof, or they may be milled across the stack or group after the clamp 9 has been applied thus also insuring perfect alinement of these notches 8. Any suitable type of clamp 9 and welding electrodes 11 may be utilized, but the fusible rods 10 are preferably of circular transverse cross-section.

However, the semi-circular notches 8 may be readily formed, and the diameter of the round rods 10 may be selected so that each rod when heated to fusing temperature and distorted will exactly fill its confining groove. This avoids excess grinding in order to produce the final laminated structures or bodies, and also insures maximum area for the heating and welding current, and the welding strips or elements may be applied to the group of laminations 7 at various localities in order to insure a durable union between the lamination plates. The improved method has proven highly satisfactory and successful in the production of welded laminated structures for magnetic switches of the type hereinabove referred to, but may obviously be utilized to advantage in the production of other laminated assemblages.

The improved method may obviously be carried on with the aid of simple and standard apparatus to produce the improved laminated assemblages with utmost strength and uniformity. Each of the laminations 7 besides being spot welded at each notch 8 to the adjacent laminations, is also welded to the adjoining fusible rod 10 so that a unitary composite structure results without wasting welding stock if the rods are of proper initial diameter. The improved structures may also be produced in diverse sizes and shapes for various uses, and may also be formed of different fusible materials. It is also noteworthy that the provision of grooves and welding rods 10 at the opposite edges of the laminations 7, not only firmly unites the latter but speeds up production since all of the welds can be simultaneously produced with one application of the electrodes 11.

It should be understood that it is not desired to limit this invention to the exact steps of the method or to the precise form of the article, herein described and shown, for various modifications within the scope of the appended claims may occur to persons skilled in the art.

I claim:

1. The method of producing a laminated magnetic assemblage, which comprises, clamping together a stack of fusible metal laminations each having a local substantially semi-circular notch in an edge thereof into intimate contact with each other so that corresponding edge notches are alined to provide a continuous semi-circular groove spanning the stack, applying a substantially cylindrical fusible metal element of less diameter than but of substantially the same cross-sectional area as that of said groove within and throughout the entire groove length, and simultaneously heating the element and the groove bounding surfaces to fusing temperatures and pressing and distorting the molten element into the groove to fill the latter and to weld the adjoining laminations together and to the distorted element along said bounding surface.

2. The method of producing a laminated magnetic assemblage, which comprises, clamping together a stack of fusible metal laminations each having local substantially semi-circular notches in its opposite edges into intimate contact with each other so that corresponding edge notches are alined to provide continuous semi-circular grooves spanning the opposite sides of the stack, applying a substantially cylindrical fusible metal element of less diameter than but of substantially the same cross-section as that of the adjacent groove within and throughout the entire adjacent groove length, and simultaneously heating both of said elements and the bounding surfaces of both of said grooves to fusing temperatures and pressing and distorting the molten elements into the adjacent grooves to fill the latter and to weld the adjoining laminations together and to the distorted elements along said bounding surfaces.

References Cited in the file of this patent

UNITED STATES PATENTS

| Number | Name | Date |
|---|---|---|
| 440,847 | Meyer | Nov. 18, 1890 |
| 632,879 | Norton | Sept. 12, 1899 |
| 1,654,306 | Paszkowski | Dec. 27, 1927 |
| 2,169,649 | Knapp et al. | Aug. 15, 1939 |
| 2,440,575 | Dedek | Apr. 27, 1948 |